(12) United States Patent
Imukai et al.

(10) Patent No.: US 8,611,882 B2
(45) Date of Patent: Dec. 17, 2013

(54) MOBILE TERMINAL DEVICE INCLUDING RINGING DEVICE

(75) Inventors: Takafumi Imukai, Minato (JP); Takahiro Shin, Kawasaki (JP); Kyozo Sano, Kato (JP); Hitoshi Yamasaki, Kawasaki (JP); Motoi Onodera, Kawasaki (JP); Yusuke Ando, Kawasaki (JP); Manabu Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 12/754,830

(22) Filed: Apr. 6, 2010

(65) Prior Publication Data

US 2010/0190483 A1 Jul. 29, 2010

Related U.S. Application Data

(63) Continuation of application No. PCT/JP2008/003100, filed on Oct. 29, 2008.

(30) Foreign Application Priority Data

Oct. 30, 2007 (JP) ................................. 2007-282278

(51) Int. Cl.
*H04M 3/00* (2006.01)
(52) U.S. Cl.
USPC ...... 455/418; 455/90.1; 455/90.2; 455/550.1; 455/567
(58) Field of Classification Search
USPC .............. 455/90.1, 90.2, 404.1, 414.1, 418, 455/550.1, 567, 419, 412.2
See application file for complete search history.

(56) References Cited

U.S. PATENT DOCUMENTS

| 7,013,006 | B1 | 3/2006 | Tischer |
| 2005/0221866 | A1* | 10/2005 | Huang et al. ................. 455/567 |
| 2006/0007038 | A1* | 1/2006 | Boling et al. ............... 342/357.1 |
| 2006/0098805 | A1 | 5/2006 | Tischer |
| 2007/0121918 | A1 | 5/2007 | Tischer |
| 2007/0147601 | A1 | 6/2007 | Tischer |
| 2007/0155438 | A1 | 7/2007 | Tischer |

FOREIGN PATENT DOCUMENTS

| JP | 2-253409 | 10/1990 |
| JP | 9-270078 | 10/1997 |
| JP | 2005-204056 | 7/2005 |
| JP | 2006-270727 | 10/2006 |
| JP | 2007-82122 | 3/2007 |
| JP | 2008-205830 | 9/2008 |

OTHER PUBLICATIONS

English language International Search Report for PCT/JP2008/003100, mailed on Dec. 2, 2008.
Partial English translation of Japanese Patent Publication 2005-204056.

(Continued)

*Primary Examiner* — Wayne Cai
(74) *Attorney, Agent, or Firm* — Staas & Halsey LLP

(57) ABSTRACT

A mobile terminal device having a ringing device includes a first control unit configured to be activated at a first activation time after power on; a second control unit configured to be activated at an activation time that is later than the first activation time; and a sound source configured to output a ringing sound in accordance with a program instruction, based on activation of the first control unit.

2 Claims, 5 Drawing Sheets

(56) References Cited

OTHER PUBLICATIONS

Partial English translation of Japanese Patent Publication 2006-270727.

Partial English translation of Japanese Patent Publication 2007-82122.

Japanese Office Action mailed May 15, 2012 issued in corresponding Japanese Patent Application No. 2008-278676.

* cited by examiner

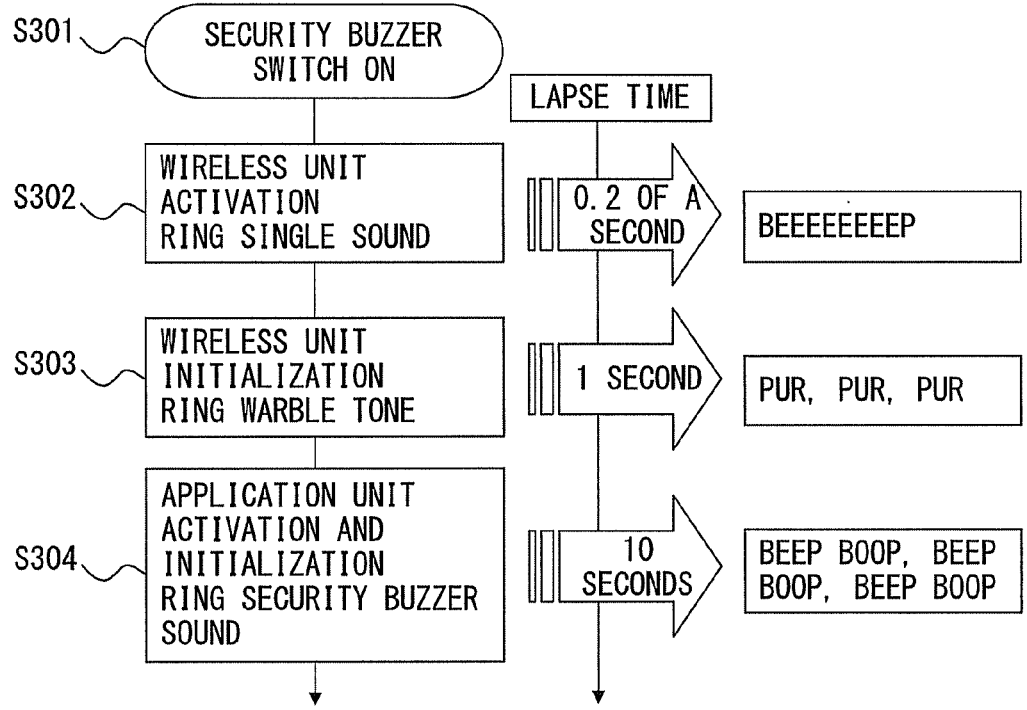
F I G. 3

US 8,611,882 B2

MOBILE TERMINAL DEVICE INCLUDING RINGING DEVICE

CROSS-REFERENCE TO RELATED APPLICATIONS

This application is a continuation of PCT application of PCT/JP2008/003100, filed on Oct. 29, 2008, which claimed priority to Japanese Application No. 2007-282278, filed Oct. 30, 2007, the entire disclosure of which are incorporated by reference as a part of this application.

FIELD

The present invention relates to a mobile terminal device having a ringing device performing a ringing operation.

BACKGROUND

In recent years, mobile terminal devices such as mobile handsets equipped with a ringing device for security purposes such a buzzer or an alarm are becoming popular with growing security awareness.

Conventionally, a buzzer for security purposes installed in a mobile handset is configured to be controlled by hardware. For example, a mobile handset is equipped with hardware that is capable of ringing regardless of the power on/off state of the mobile handset. This enables the ringing operation upon turning the switch of the buzzer on, even if the power of the main unit of the mobile handset is off.

However, when mounting such a security buzzer with hardware control on a mobile terminal device such as a mobile handset, there is a problem that the hardware needs to be mounted on each mobile terminal device, incurring costs such as production costs in proportion to the number of units.

Therefore, for example, Patent document 1 discloses an alarm control method with which various sounds can be created without a divider circuit and the like for switching sounds, by providing unit for specifying data for deciding the type of the alarm by a program, and unit for outputting the data bit by bit at regular intervals.

However, when providing a mobile terminal device with ringing by software control as in Patent document 1, there is a problem that while the ringing can be performed with no problem in the state in which the mobile terminal device is activated, but in the state in which the mobile terminal device is not activated (for example, in the state in which the power of the mobile terminal device is off), the buzzer cannot perform ringing. In addition, since it requires some time to activate the mobile terminal device, there is a problem that it takes time before the ringing of the buzzer actually starts after an instruction for the start of the ringing is issued by a switch and the like of the buzzer.

In relation to this technique, Patent document 2 discloses a mobile handset equipped with a security function with which even when the mobile handset is performing a process to turn off the power, the security buzzer starts ringing immediately upon turning the switch of the security buzzer on, and continues to ring.

Patent document 1: Japanese Laid-open Patent Publication No. 02-253409

Patent document 2: Japanese Laid-open Patent Publication No. 2007-082122

SUMMARY

The device disclosed herein is to provide a mobile terminal device having a ringing device that takes short time to start ringing from the power off state.

In order to solve the above problem, a device disclosed herein is a mobile terminal device having a ringing device, and includes a first control unit configured to be activated at a first activation time after power on; a second control unit configured to be activated at an activation time that is later than the first activation time; and a sound source configured to output a ringing sound in accordance with a program instruction, based on activation of the first control unit.

As described above, according to the device disclosed herein, a mobile terminal device having a ringing device that takes short time to start ringing from the power off state can be provided.

BRIEF DESCRIPTION OF DRAWINGS

FIG. 3 is a diagram illustrating the outline of a ringing process of the security buzzer in the mobile terminal device according to the embodiment example.

DESCRIPTION OF EMBODIMENTS

Hereinafter, an embodiment is explained with reference to drawings. However, the embodiment explained below is an example and not intended for excluding the application of various alterations and techniques which are not explicitly described below. In other words, the embodiment may be implemented while making various alterations (combination of embodiment examples and the like) without departing from the spirit and scope of the invention.

Figure 1:
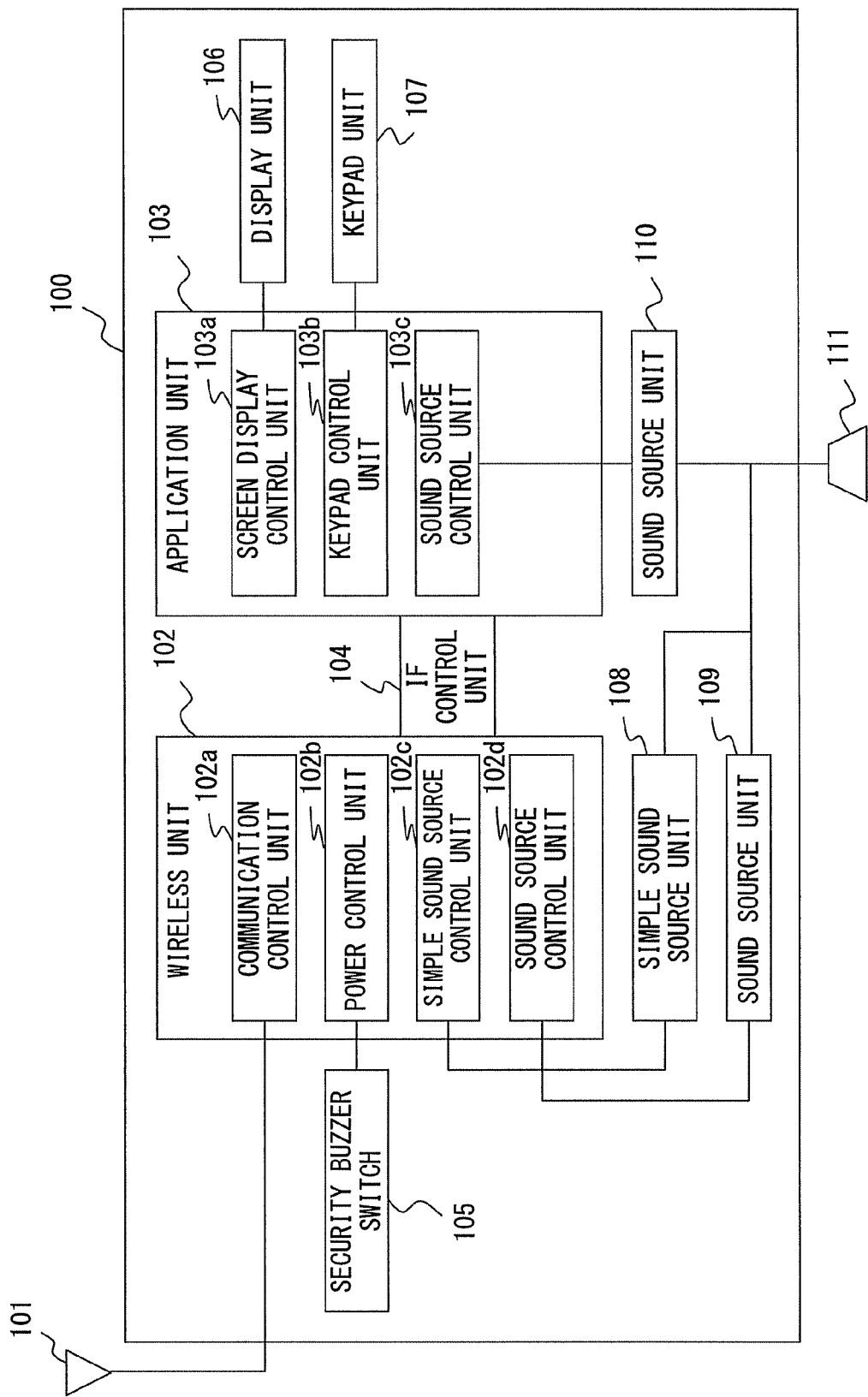
FIG. 1 is a diagram illustrating a configuration example of a mobile terminal device equipped with a buzzer according to the embodiment example for security purposes.

FIG. 1 illustrates a configuration example of a mobile terminal device 100 equipped with a buzzer according to this embodiment example for security purposes.

As illustrated in FIG. 1, the mobile terminal device 100 has an antenna 101 for wireless communication, a wireless unit 102 realizing the wireless communication function and corresponding to the first control unit, an application unit 103 performing screen display and the like by executing a predetermined program and corresponding to the second control unit, an IF (Interface) control unit 104 controlling data exchange between the wireless unit 102 and the application unit 103, a security buzzer switch 105 being the switch of the buzzer, a display unit 106 displaying given characters and the like, a keypad unit 107 being unit for inputting characters and the like, a simple sound source unit 108 and a sound source unit 109 ringing with the control by the wireless unit 102 and corresponding to the sound source, a sound source unit 110 ringing with the control of the application unit 103, and a speaker 111 outputting a buzzer sound and corresponding to the ringing device.

The wireless unit 102 has a communication control unit 102a performing control for conducting wireless communication, a power control unit 102b performing power control, a simple sound source control unit 102c controlling the ringing of the simple sound source unit 108, and a sound source control unit 102d controlling the ringing of the sound source unit 109.

Here, the communication control unit 102a performs control to conduct voice communication and data communication with another mobile terminal device and the like using a wireless communication system that in accordance with the needs.

The power control unit 102b performs power control for the hardware constituting the mobile terminal device 100. For example, when the switch of the mobile terminal device 100 that is not illustrated in the drawing is turned ON, the power control unit 102b starts the power supply to the wireless unit 102, and also starts the power supply to the application unit 103. The same applies to an instruction from the security buzzer switch 105.

The simple sound source control unit 102c is unit for making the simple sound source unit 108 ring, and the sound source control unit 102d is unit for making the sound source unit 109 ring. For example, when the security buzzer switch 105 turns ON and the wireless unit 102 starts activation, the simple sound source control unit 102c becomes ready for operation at an early stage, and makes the simple sound source 108 ring. The simple sound source control unit 102c performs the ringing of the simple sound source unit 108 immediately, as soon as it becomes ready for operation after the power is put in the mobile terminal device 100. Next, when the sound source control unit 102d becomes ready for operation, the ringing by the simple sound source control unit 102c is stopped, and the sound source control unit 102d makes the sound source unit 109 ring.

The application unit 103 has a screen display control unit 103a performing control of display on the display unit 106, a keypad control unit 103b detecting input from the keypad unit 107, and a sound source control unit 103c controlling the ringing of the sound source unit 110.

The screen display control unit 103a performs screen display on the display unit 106 in accordance with the executed program (e-mail, WEB browser, address book, etc.). Meanwhile, the keypad control unit 103b detects key input from the keypad unit 107, and makes the screen display control unit 103a display the detected key on the display unit 106. Meanwhile, the sound source control unit 103c is unit for making the sound source unit 110 ring.

The security buzzer switch 105 is a switch that performs notification to the power control unit 102b upon detecting that the switch has been turned on. The display unit 106 is a display device constituted by LCD (Liquid Crystal Display), organic EL (Electro-Luminescence), and the like. The keypad unit 107 is a keypad constituted by alphanumeric keys, functions keys and the like for inputting telephone numbers and characters (including alphanumeric characters).

The simple sound source 108 and the sound source 109 are sound source devices that are rung by the wireless control unit 102. Meanwhile, the sound source 110 is a sound source device that is rung by the application unit 103.

In present embodiment, (1) the simple sound source unit 108, (2) the sound source unit 109, and the (3) sound source unit 110 can make more complex sounds in this order. For example, the simple sound source unit 108 can realize a beep sound, while the sound source unit 109 can realize a warble tone, and the sound source unit 110 can realize a predetermined buzzer sound. Therefore, for example, a beep sound source may be used for the simple sound source unit 108, an FM (Frequency Modulation) sound source maybe used for the sound source unit 109, and a PCM (Pulse Code Modulation) sound source may be used for the sound source unit 110.

Meanwhile, the wireless unit 102 and the application unit 103 are respectively realized by executing a predetermined program in an independent CPU (Central Processing Unit).

For example, when the power is put in the mobile terminal device 100, the power control unit 102b performs power control so that power is supplied to the wireless unit 102, as well as to the application unit 103.

In the wireless unit 102, programs are executed following a predetermined order, and the communication control unit 102a, the simple sound source control unit 102c, the sound source control unit 102d, etc. are activated. In addition, also in the application unit 103, a program is executed flowing a predetermined order, and the screen display control unit 103a, the keypad control unit 103b, the sound source control unit 103c, etc. are activated.

Here, since the simple sound source control unit 102c rings a beep sound, it becomes ready for operation immediately after the activation of the wireless unit 102. After that, the sound source control unit 102d that can realize a more complex sound is activated.

In addition, the mobile terminal device 100 according to this embodiment example illustrates a case in which the activation of the wireless unit 102 is completed earlier than the activation of the application unit 103, as an example.

As described above, in the mobile terminal device 100 according to this embodiment example, (1) the simple sound source control unit 102c, (2) the sound source control unit 102d, (3) the sound source control unit 103c become ready for operation in this order. In other words, (1) the simple sound source unit 108, (2) the sound source unit 109, (3) the sound source unit 110 become ready for ringing in this order.

Figure 2:
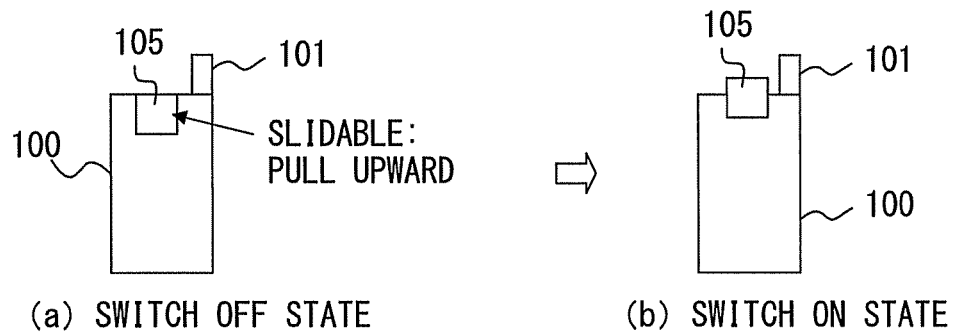
FIG. 2 illustrates an example a security buzzer switch the mobile terminal device according to the embodiment example.

FIG. 2 illustrates an example of the security buzzer switch 105 of the mobile terminal device 100 according to the present embodiment example.

FIG. 2(a) illustrates the state in which the security buzzer switch 105 is OFF, and FIG. 2(b) illustrates the state in which the security buzzer switch 105 is ON.

As illustrated in FIG. 2, the security buzzer switch 105 is slidably installed on the mobile terminal device 100. When the security buzzer switch 105 is slid upward in the drawing, the buzzer switch 105 enters the ON state. At this time, a predetermined signal is transmitted to the power control unit 102b, to start the ringing process of the security buzzer.

FIG. 3 is a diagram illustrating the outline of the ringing process of the security buzzer in the mobile terminal device 100 according to the present embodiment example.

(Step S301)

When the security buzzer switch 105 turns ON in the state in which the power of the mobile terminal unit 100 is OFF, a predetermined signal is transmitted to the power control unit 102b. Then, the power control unit 102b starts power supply to the wireless unit 102, and also starts power supply to the application unit 103.

(Step S302)

When the activation of the wireless unit 102 starts, the simple sound source control unit 102c becomes ready for operation after about 0.2 of a second, and starts the ringing of the simple sound control unit 102c. The buzzer sound at this time is a beep sound "beep . . . ".

(Step S303)

After about one second from the activation start of the wireless unit 102, the sound source control unit 102d becomes ready for operation, At this time, the sound source control unit 102d stops the operation of the simple sound source control unit 102c, and starts the ringing of the sound source unit 110. The buzzer sound at this time is a warble tone "pur, pur . . .", (Step S304)

In the application unit 103 that started activation as well as the wireless unit 102, the sound source control unit 103c becomes ready for operation after about 10 seconds from the activation start. The sound source control unit 103c communicates, through the IF control unit 104, with the sound source control unit 103c to tell it to stop ringing, and starts the ringing of the sound source 110. The buzzer sound at this time is a predetermined buzzer sound "beep boop beep boop . . . ".

The sound source unit 103c continues the ringing of the buzzer sound until, for example, the security buzzer switch 105 enters the OFF state. Meanwhile, the lapse times (0.2 of a second, 1 second, 10 seconds) mentioned above have been used for facilitate the understanding of the ringing process of the security buzzer in the mobile terminal device 100, and the lapse times are not limited to these.

Figure 4:
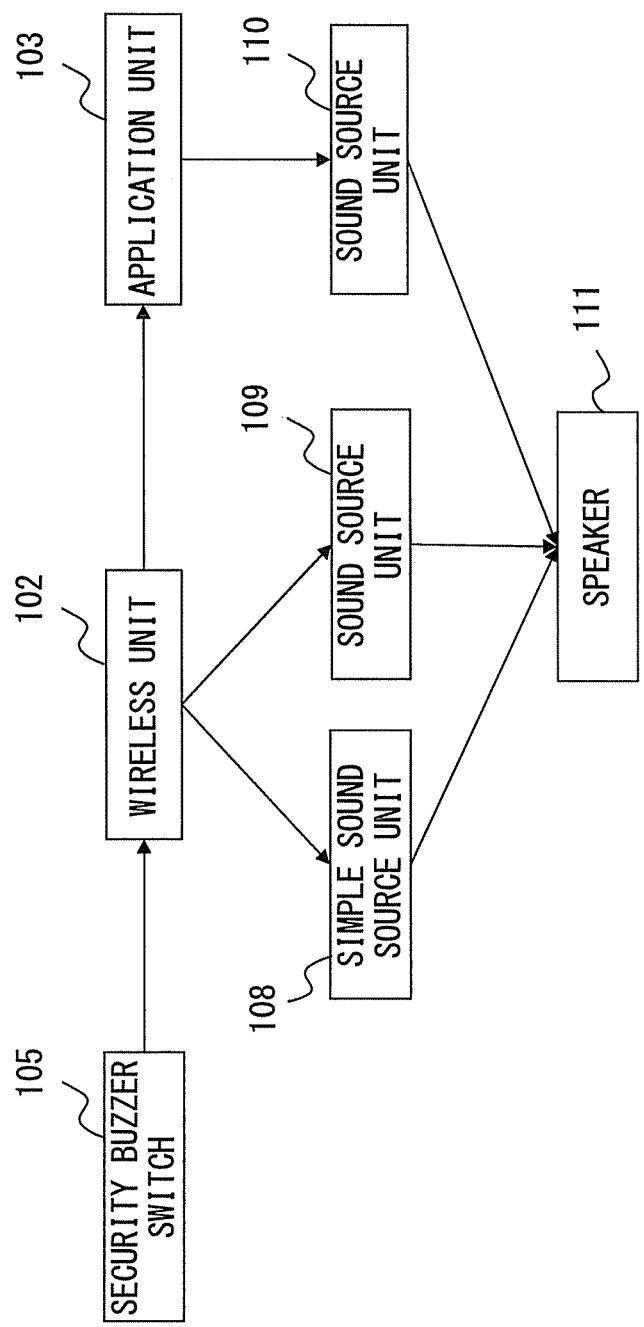
FIG. 4 is a diagram illustrating the operation of each processing unit in the ringing process of the security buzzer illustrated in FIG. 3 according to the embodiment example.

FIG. 4 is a diagram illustrating the operation of each processing unit in the ringing process of the security buzzer illustrated in FIG. 3 according to the present embodiment example.

The security buzzer switch 105 transmits a predetermined signal in accordance with the ON/OFF state to the wireless unit 102 (power control unit 102b).

When the security buzzer switch 105's shift to ON state is transmitted, the wireless unit 102 (power control unit 102b) activates the wireless unit 102 itself, and also activates the application unit 103.

When the wireless unit 102 is activated to the stage where the simple sound source control unit 102c is ready for operation, the wireless unit 102 starts the ringing using the simple sound source unit 108. Then, the simple sound source unit 108 rings a beep sound through the speaker 111.

When the wireless unit 102 is activated to the stage where the sound source control unit 103c is ready for operation, the wireless unit 102 stops the ringing of the simple sound source unit 108, and start the ringing using the sound source unit 109. Then, the sound source unit 109 rings a warble tone through the speaker 111.

Further, when the application unit 103 is activated to the stage where the sound source control unit 103c is ready for operation, the ringing of the sound source unit 109 is stopped, and the ringing using the sound source 110 is started. Then, the sound source unit 110 rings a predetermined buzzer sound through the speaker 111.

Figure 5:
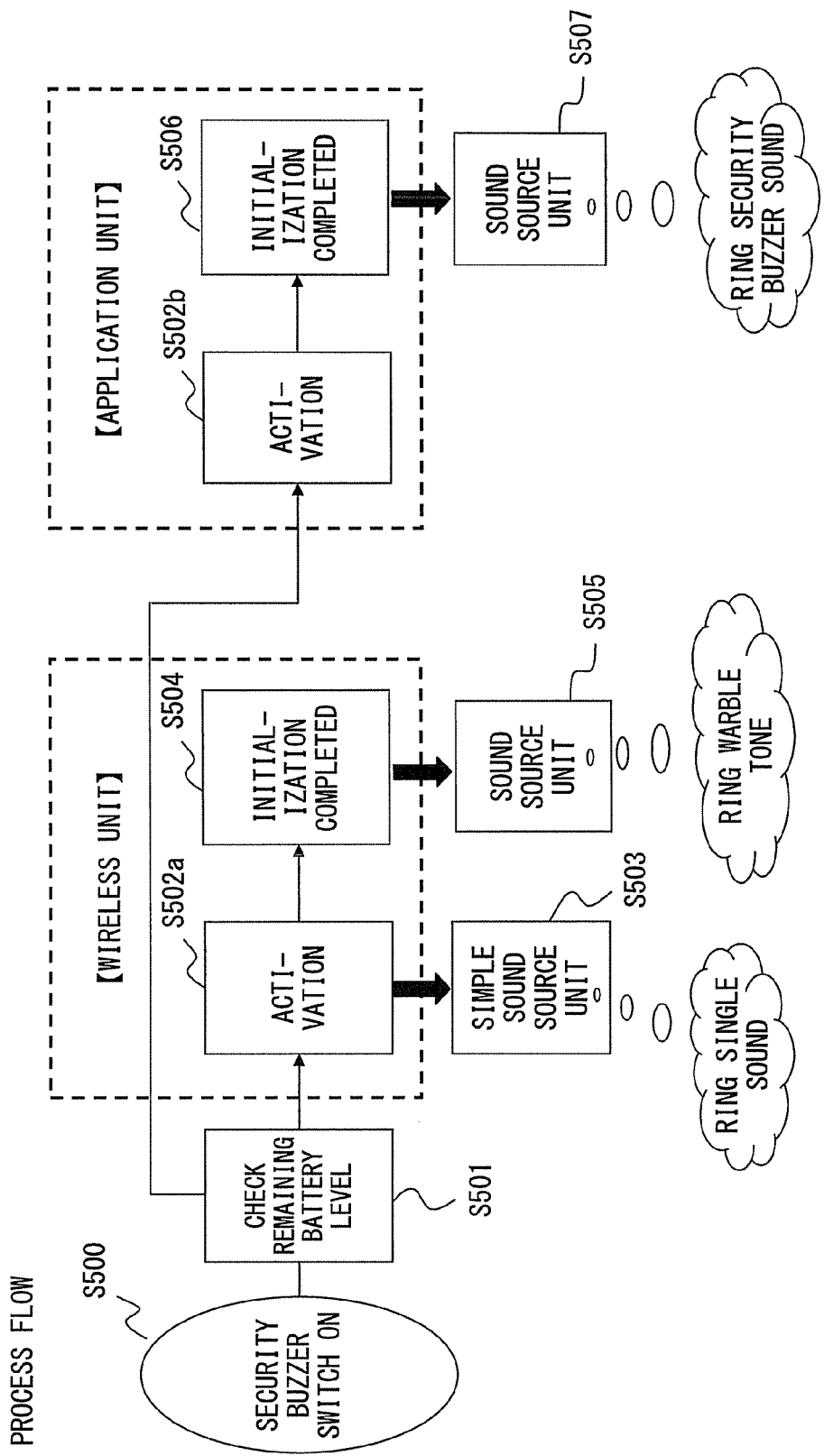
FIG. 5 is a flowchart illustrating the ringing process of the security buzzer of the mobile terminal device according to the embodiment example.

FIG. 5 is a flowchart illustrating the ringing process of the security buzzer of the mobile terminal device 100 according to the present embodiment example. An explanation is made about a case when the security buzzer switch 105 is turned ON in the state in which the power of the mobile terminal device 100 is OFF.

(Step S500)

When the security buzzer switch 105 enters ON state, a signal representing the ON state is transmitted to the power control unit 102b.

(Step S501)

Upon receiving the transmission from the security buzzer switch 105, the power control unit 102b detects the remaining level of a battery provided in the mobile terminal device 100. Then, the power control unit 102b compares the detected remaining level with a predetermined reference level.

Then, when the remaining level is below the reference level, the power control unit 102b supplies power to the wireless unit 102, to activate the wireless unit 102. Meanwhile, when the remaining level is above the reference level, the power control unit 102b supplies power to the wireless unit 102 as well as to the application unit 103, to activate the wireless unit 102 and the application unit 103.

In the step S500, when the security buzzer switch 105 is turned ON in the state in which the power of the mobile terminal device 100 is ON and the remaining level is below the reference level, the power control unit 102b may stop power supply to the application unit 103 and instructs the wireless unit 102 (the simple sound source control unit 102c or the sound source control unit 102d depending on the remaining level) to perform the ringing process, and when the remaining level is above the reference level, instruction for the ringing process may be issued to the application unit 103 (the sound source control unit 103c).

(Step S502a)

The activation of the wireless unit 102 is started by the operation of the power control unit 102b. At this time, the communication control unit 102a, the power control unit 102b, the simple sound source control unit 102c, the power control unit 102d, etc. are made executable by sequentially reading out programs from a storage device provided in the mobile terminal device 100 and locating them to be executable in a memory provided in the mobile terminal device 100.

Then, when the simple sound source control unit 102c becomes executable, the simple sound source control unit 102c instructs the simple sound source unit 108 to ring a beep sound.

(Step S502b)

Ina similar manner as in the step S502a, the activation of the application unit 103 is started by the operation of the power control unit 102b, and, the screen display control unit 103a, the keypad control unit 103b, the sound source control unit 103c, etc. are made executable by sequentially reading out programs from a storage device provided in the mobile terminal device 100 and locating them to be executable in a memory provided in the mobile terminal device 100.

(Step S503)

The simple sound source unit 108 outputs a beep sound from the speaker 111 in accordance with the instruction from the simple sound source control unit 102c.

(Step S504)

When the initialization at the wireless unit 102 is completed and the sound source control unit 102d becomes executable, the sound source control unit 102d instructs the simple sound source control unit 102c to stop the ringing and instructs the sound source unit 109 to ring a warble tone.

(Step S505)

The sound source unit 109 outputs a warble tone from the speaker 111 in accordance with the instruction from the sound source control unit 102d.

(Step S506)

When the application unit 103 that started activation by the operation of the power control unit 102b completes initialization, the sound source control unit 103c becomes ready for operation. Then, the sound source control unit 103c instructs the sound source control unit 103c to stop ringing, and instructs the sound source unit 110 to ring a predetermined buzzer sound.

(Step S507)

The sound source unit 110 outputs a predetermined buzzer sound from the speaker 111 in accordance with the instruction from the sound source control unit 103c.

Meanwhile, in the step S501, the power control unit 102b may simply supply power to the wireless unit 102 as well as the application unit 103 to activate the wireless unit 102 and the application unit 103.

While the mobile terminal device 100 according to the present embodiment example has the simple sound source control unit 102c and the sound source control unit 102d in the wireless unit 102 and has the sound source control unit 103c in the application unit 103 in the explanation above since the activation of the application unit 103 is faster than that for the wireless unit 102, but the configuration is not limited to this.

For example when the activation of the wireless unit 102 is faster than that for the application unit 103, the simple sound source control unit 102c and the sound source control unit 102d may be provided in the application unit 103, and the sound source control unit 103c may be provided in the wireless unit 102.

The wireless unit 102 may be configured with the simple sound source control unit 102c only. In this case, the simple sound source control unit 102c may ring the beep sound until the sound source control unit 103c becomes ready for activation.

One common sound source unit may be used for the sound source unit 109 and the sound source unit 110. In this case, it may be capable of ringing a buzzer sound in accordance with an instruction from the sound source control unit 102d or the sound source control unit 103c.

While the mobile terminal device 100 according to the present embodiment example is equipped with a wireless unit 102 and the application unit 103, the present embodiment example may be applied to, for example, a case of a buzzer device controlled by a program executed by one CPU. That is, a buzzer device controlled by software may be equipped with the simple sound source control unit 102c and the sound source control unit 102d (or the sound source control unit 103c), and the simple sound source unit 108 and the sound source unit 110.

As described above, the mobile terminal device 100 according to the present embodiment example 100 performs the ringing process of (1) simple sound source control unit 102c, (2) the sound source control unit 102d, (3) the sound control unit 103c, in this order, in the process of activating the wireless unit 102 and the application unit 103 from the power OFF state. That is, the ringing process is performed by them in the order in which they become ready for operation.

As a result, even in a state in which the power of the mobile terminal device is OFF, the turning on of the security buzzer switch 105 and the start of the ringing of the security buzzer can be performed with little time lag.

Since the mobile terminal device 100 according to the present embodiment example makes the simple sound source control unit 102c, the sound source units 109 and 110 ring by software control, the need for hardware for each mobile terminal device 100 is eliminated. Accordingly, it becomes possible to reduce production costs for the security buzzer device.

The power consumption can be suppressed by performing the ringing process by activating the wireless unit 102 only, when the remaining level is below the reference level, as in the step S501 illustrated in FIG. 5. Accordingly, even when the remaining battery level is low, a longer ringing time may be secured.

In a similar manner, if the remaining level is below the reference level when the security buzzer switch 105 is turned ON in the state in which the power of the mobile terminal device 100 is ON, the power control unit 102b stops power supply to the application unit 103 and instructs the wireless unit 102 (the simple sound source control unit 102c or the sound source control unit 102d according to the remaining level) to perform the ringing process, making it possible to suppress the power consumption. Accordingly, even when the remaining battery level is low, a longer ringing time may be secured.

By securing a longer ringing time, the security function of the security buzzer device can be improved.

As described above, according to the mobile terminal device, even when the instruction for the ringing of the buzzer is issued in the state in which the mobile terminal device is OFF, the first sound control unit operates immediately after the power on and makes the first sound source ring the first buzzer sound, making it possible to start the ringing of the buzzer before the second sound source rings the second buzzer sound.

What is claimed is:

1. A mobile terminal device having a ringing device, the mobile terminal device comprising:
    a first controller to be activated at a first activation time after power on;
    a second controller to be activated at a second activation time that is longer than the first activation time after the power on;
    a first sound source to output a ringing sound by use of the first controller after the first activation time of the power on; and
    a second sound source to output a ringing sound, alternative to the first sound source, by use of the second controller after the second activation time of the power on.

2. The mobile terminal device according to claim 1, wherein the first controller is a wireless unit, and the second controller is an application unit.

* * * * *